(12) United States Patent
Woytowtiz

(10) Patent No.: US 7,181,319 B1
(45) Date of Patent: Feb. 20, 2007

(54) HYBRID MODULAR/DECODER IRRIGATION CONTROLLER

(75) Inventor: Peter J. Woytowtiz, San Diego, CA (US)

(73) Assignee: Hunter Industries, Inc., a Delaware Corporation, San Marcos, CA (US)

( * ) Notice: Subject to any disclaimer, the term of this patent is extended or adjusted under 35 U.S.C. 154(b) by 0 days.

(21) Appl. No.: 11/451,929

(22) Filed: Jun. 13, 2006

Related U.S. Application Data

(63) Continuation of application No. 10/883,283, filed on Jun. 30, 2004, now Pat. No. 7,069,115.

(51) Int. Cl.
G05B 11/01 (2006.01)

(52) U.S. Cl. .......................... 700/284; 700/16; 700/19; 137/78.3; 239/69

(58) Field of Classification Search .................. 700/16, 700/17, 19, 90, 283, 284; 239/63, 68, 69, 239/70; 137/78.3
See application file for complete search history.

(56) References Cited

U.S. PATENT DOCUMENTS

| | | | |
|---|---|---|---|
| 3,653,595 A | 4/1972 | Greengard et al. ........... 239/70 |
| 3,951,339 A | 4/1976 | DuFresne .................... 239/66 |
| 4,007,458 A | 2/1977 | Hollabaugh ................. 340/310 |
| 4,131,882 A | 12/1978 | Hollabaugh et al. ........ 340/310 |
| 4,176,395 A | 11/1979 | Evelyn-Veere et al. ..... 364/420 |
| 4,209,131 A | 6/1980 | Barash et al. ................. 239/68 |
| 4,545,396 A | 10/1985 | Miller et al. ................ 137/78.3 |
| 4,548,225 A | 10/1985 | Busalacchi ................. 137/78.3 |
| 4,760,547 A | 7/1988 | Duxbury ..................... 364/420 |
| 4,895,303 A | 1/1990 | Freyvogel ................... 239/61 |
| 5,021,939 A | 6/1991 | Pulgiese ..................... 364/143 |
| 5,048,755 A | 9/1991 | Dodds .......................... 238/64 |
| 5,097,861 A | 3/1992 | Hopkins et al. ........... 137/78.3 |
| 5,333,785 A | 8/1994 | Dodds et al. ................. 239/69 |
| 5,337,957 A | 8/1994 | Olson .......................... 239/63 |
| 5,337,959 A | 8/1994 | Boyd ......................... 239/163 |
| 5,444,611 A | 8/1995 | Woytowitz et al. ......... 364/145 |
| 5,479,338 A | 12/1995 | Ericksen et al. ............ 364/145 |
| 5,651,500 A | 7/1997 | Patterson et al. ............. 239/69 |
| 5,839,658 A | 11/1998 | Sarver ........................... 239/1 |
| 6,721,630 B1 | 4/2004 | Woytowitz ................. 700/284 |
| 6,766,221 B1 | 7/2004 | Christiansen ............... 700/284 |
| 6,898,467 B1 | 5/2005 | Smith et al. .................. 700/20 |
| 2005/0038529 A1 | 2/2005 | Perez et al. .................. 700/19 |
| 2005/0267641 A1 | 12/2005 | Nickerson et al. .......... 700/284 |
| 2005/0273205 A1 | 12/2005 | Nickerson et al. .......... 700/284 |

Primary Examiner—Leo Picard
Assistant Examiner—Douglas S. Lee
(74) Attorney, Agent, or Firm—Michael H. Jester

(57) ABSTRACT

A plurality of receptacles in an irrigation controller removably receive a plurality of modules. At least one station module is configured for insertion into a first one of the receptacles and is connectable to a corresponding solenoid actuated valve through a dedicated field valve line and common return line. The station module includes at least one switching device for selectvely providing a first power signal that energizes the corresponding solenoid actuated valve. At least one encoder module is configured for insertion into a second one of the receptacles and is connectable to a multi-wire path for sending encoded signals and a second power signal along the multi-wire path for selectively energizing one of a plurality of solenoid actuated valves connected to corresponding decoder circuits connected along the multi-wire path. A processor executes the stored watering program and controls the station module and/or the encoder module in accordance with the stored watering program.

20 Claims, 6 Drawing Sheets

HYBRID MODULAR/DECODER IRRIGATION CONTROLLER

CROSS REFERENCE TO RELATED APPLICATION

This application is a continuation of U.S. patent application Ser. No. 10/883,283, filed Jun. 30, 2004 now U.S. Pat. No. 7,069,115, which has been allowed

FIELD OF THE INVENTION

The present invention relates to electronic controllers that control valves which supply water to sprinklers that irrigate turf and landscaping.

BACKGROUND OF THE INVENTION

In many parts of the world due to inadequate rainfall it is necessary at certain times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. The type, placement and flow rates for each of the sprinklers are pre-selected when an irrigation system is designed and/or installed. The optimum flow rate provided by each sprinkler should preferably fall within plus or minus one-quarter gallon-per minute (GPM). The amount of water supplied by each sprinkler is largely determined by the size and configuration of its nozzle orifice(s), although variations result from fluctuations in water pressure that cannot be fully negated with regulators.

Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone. A modern electronic irrigation controller typically includes a microprocessor that executes one or more watering programs. The watering programs can be pre-programmed by the user via push button and/or rotary controls. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Over the past decade, modular expandable irrigation controllers have gained increasing popularity. In these controllers, the base portion of the system contains the microprocessor and user actuated controls. Each station is then controlled by a corresponding station module which comprises a plastic housing that encloses and supports a station module circuit, as well as wire connection terminals for connecting wires to a plurality of solenoid actuated valves. Typically each station module circuit includes a plurality of triacs or other switching devices and can independently control a plurality of solenoid actuated valves, i.e., stations. The station modules contain pins, sockets, card edge connectors or some other standard form of electro-mechanical connectors for allowing them to be inserted into slots or receptacles in either the housing that contains the microprocessor or a separate back panel hinged to the microprocessor housing. When the station modules are plugged into a modular expandable irrigation controller they are mechanically supported and an electrical connection is made between the microprocessor and the driver. See for example, U.S. Pat. No. 6,721,630 B1 of Peter Woytowitz, assigned to Hunter Industries, Inc., the assignee of the present application.

The advantage of an irrigation controller with a modular expandable configuration is that the controller need only be equipped with the minimum number of station modules that can control the total number of stations needed. Thus, for example, an irrigation system may have only three zones, requiring only a single station module, while another may have twelve stations which might require four station modules. Considerable cost savings are thus achieved. Moreover, if an irrigation system expands after initial installation because the landscaping has increased, additional station modules can be plugged into the controller. The station modules can also be removed and replaced if damaged, for example, during a lightening strike. In some modular expandable irrigation systems the base unit is capable of controlling a minimal number of stations without requiring the addition of any station modules. In others, such as the ICC™ irrigation controller manufactured and sold by Hunter Industries, Inc., at least a power module and one irrigation station module must be plugged into the controller in order to operate any stations or zones.

A modular expandable irrigation controller requires a dedicated field valve line to extend from the controller to the solenoid valve of each station. A common line returns from each of the solenoids to complete the circuit. Thus each station is controlled by the microprocessor through a separate circuit. When a residential irrigation system is installed, typically the controller is mounted in the garage and all the wires are laid underground to one or more subterranean valve boxes that contain the solenoid operated valves. The installers frequently do not have the foresight to install extra wires to support additional stations at some future date. This can lead to major cost and expense if the homeowner has a modular expandable irrigation controller that allows for the addition of more stations, but the hard wires to reach them are not already in place.

Another type of irrigation controller exists that does not require a dedicated field valve line to each station. So-called "decoder" systems are available in either two wire or three wire versions. In a two-wire decoder system one or two way communication between the microprocessor and the valves is achieved by encoding signals and transmitting them over the same two wires that carry the power to the valve solenoids. The valves are connected in parallel to the two wires through decoder circuits that are used to identify commands uniquely intended for that station. In a three-wire decoder system two of the wires are used for power and the third is used for communications. See, for example, U.S. Pat. No. 3,653,595 of Greengard, Jr. et al.; U.S. Pat. No. 4,209,131 of Barash et al. assigned to Motorola; U.S. Pat. No. 4,176,395 of Evelyn-Veere et al. assigned to Clemar Manufacturing; and U.S. Pat. No. 5,048,755 of Dodds et al.

In irrigation control systems of the decoder type signal modulation (AM or FM) is typically used to encode the commands and data sent between the microprocessor and the stations. Decoder systems can easily be expanded to provide additional stations simply by attaching additional decoder circuits and valves to the two-wire or three-wire path at the locations of each new station. It is not necessary to run dedicated field valve lines all the way back to the main controller for each new station. Thousands of feet of wiring can be accommodated by decoder irrigation systems so very large properties such as golf courses, housing subdivisions, apartments and condominiums can easily be automatically irrigated. Despite all their apparent versatility and attractiveness, decoder irrigation systems are much more complex, less well understood by users, and harder to troubleshoot than conventional modular expandable irrigation control systems that utilize a dedicated field valve line for each station.

U.S. Pat. No. 5,389,658 of Sarver discloses a method of retrofitting an existing irrigation control system including a centralized controller, a plurality of independent valve control lines extending between the controller and the valves, and a return line extending from each of the valves to the controller. A terminal strip is installed within the controller and connects each of the valve control lines together. A signal encoder circuit board is permanently installed within the controller and a decoder is installed in series with each valve assembly. When the retrofitting is complete the irrigation control system of the Sarver patent essentially comprises a two wire decoder system. The first "wire" is the combination of each of the valve control lines now all in parallel to each other and all connected to one another via the terminal strip. The "second wire" is the common return line returning from each valve assembly. The permanent conversion of a conventional irrigation controller to a decoder system is not a practical solution for landscape contractors because it requires too much expertise and effort to make the physical modifications that are required. In addition, few conventional irrigation controllers have the space and other physical configuration requirements that would allow them to accept the installation and connection of the terminal strip and signal encoder circuit board. Moreover, such a retrofitting process would be impractical given the wide variety of programming and output formats of various conventional controllers already installed in the field. The resulting decoder controller disclosed in Sarver does not afford the benefits of a simpler conventional irrigation control system wherein each station essentially comprises a separate circuit.

SUMMARY OF THE INVENTION

It is therefore the primary object of the present invention to provide an irrigation controller that takes advantage of the best attributes of a modular expandable irrigation controller and a decoder irrigation system.

In accordance with the present invention a hybrid irrigation controller has a plurality of manually actuable controls for entry or selection of a watering program and a memory for storing the watering program. The controller further has a plurality of receptacles for removably receiving a plurality of modules. At least one station module is configured for insertion into a first one of the receptacles and is connectable to a corresponding solenoid actuated valve through a dedicated field valve line and common return line. The station module includes at least one switching device for selectively providing a first power signal that energizes the corresponding solenoid actuated valve. At least one encoder module is configured for insertion into a second one of the receptacles and is connectable to a multi-wire path for sending encoded signals and a second power signal along the multi-wire path for selectively energizing one of a plurality of solenoid actuated valves connected to corresponding decoder circuits connected along the multi-wire path. A processor executes the stored watering program and controls the station module and/or the encoder module in accordance with the stored watering program.

The present invention also provides a hybrid irrigation control system that includes a first plurality of valves and a second plurality of valves. The system further includes a plurality of manually actuable controls for entry or selection of a watering program, a memory for storing the watering program, and a plurality of receptacles for removably receiving a plurality of modules. At least one station module is removably inserted into a first one of the receptacles and is connected to the first plurality of valves through corresponding dedicated field valve lines and a common return line and includes a plurality of switching devices for supplying a first power signal that selectively energizes the first plurality of valves. At least one encoder module is removably inserted into a second one of the receptacles and is connected to a multi-wire path for sending encoded signals and a second power signal along the multi-wire path for selectively energizing the second plurality of valves via decoder circuits connected along the multi-wire path. A processor is provided for executing the stored watering program and controlling the station module and/or the encoder module in accordance with the stored watering program.

The present invention also provides a method of controlling a plurality of valves in an irrigation system including the steps of: 1) entering or selecting a watering program; 2) selectively energizing a first plurality of valves using dedicated field valve lines and a common return line in accordance with the watering program; and 3) selectively energizing a second plurality of valves connected to a multi-wire path utilizing encoded signals in accordance with the watering program.

The present invention further provides a method of remotely programming a decoder circuit adapted for use in an irrigation system. This is done by: 1) providing a hand-held programmer with a transmitter connected to a first antenna; 2) placing the hand-held programmer in close proximity to a decoder circuit configured to be connected to at least one valve and having a receiver connected to a second antenna; 3) entering identity commands via the hand-held programmer and sending them via the transmitter and the first antenna to the second antenna; and 4) receiving the identity commands via the receiver in the decoder circuit and establishing a unique identity for the decoder circuit so that it will respond to commands from an irrigation controller connected to the decoder circuit.

The present invention further provides a method of remotely exchanging diagnostic information with a decoder circuit adapted for use in an irrigation system. This is done by: 1) providing a hand-held programmer with a first transceiver connected to a first antenna; 2) placing the hand-held programmer in close proximity to a decoder circuit configured to be connected to at least one valve and having a second transceiver connected to a second antenna; 3) using the hand-held programmer to transmit at least one query to the decoder circuit via the first transceiver; 4) receiving the query via the second transceiver in the decoder circuit and transmitting diagnostic information from the decoder circuit via the second transceiver; and 5) receiving the diagnostic information with the first transceiver in the hand-held programmer.

DETAILED DESCRIPTION

The entire disclosures of U.S. Pat. No. 6,721,630 B1 granted Apr. 13, 2004 to Peter J. Woytowitz entitled EXPANDABLE IRRIGATION CONTROLLER WITH OPTIONAL HIGH-DENSITY STATION MODULE and pending U.S. patent application Ser. No. 10/848,394 filed May 17, 2004 also in the name of Peter J. Woytowitz entitled ISOLATED MODULAR EXPANDABLE IRRIGATION CONTROLLER are hereby incorporated by reference. The aforementioned patent and application are both assigned to Hunter Industries, Inc., the assignee of the subject application.

Figure 1:
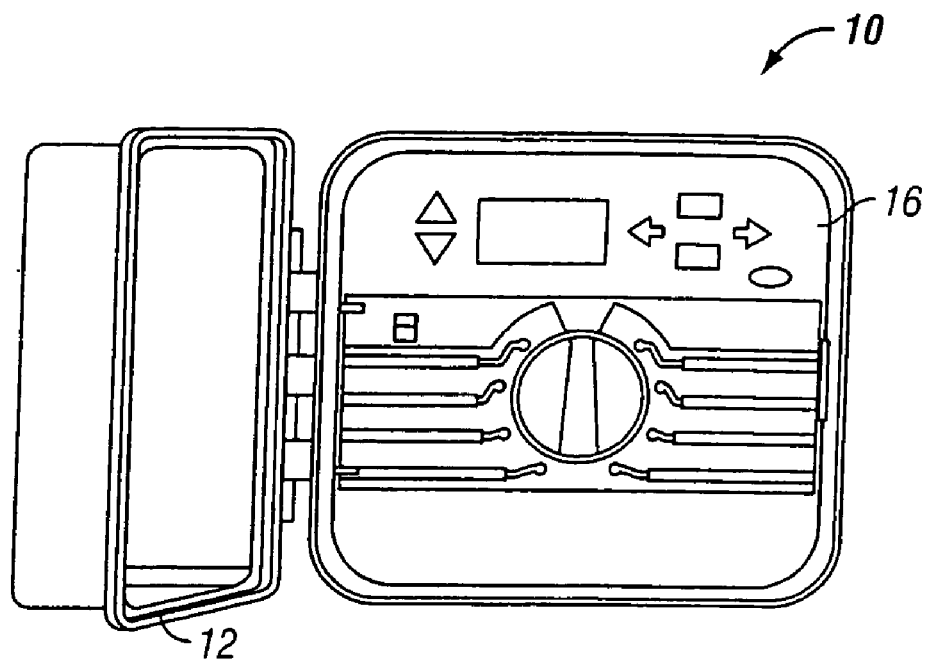
FIG. 1 illustrates an embodiment of the irrigation controller of the present invention with its front door open to reveal its removable face pack.
Figure 2:
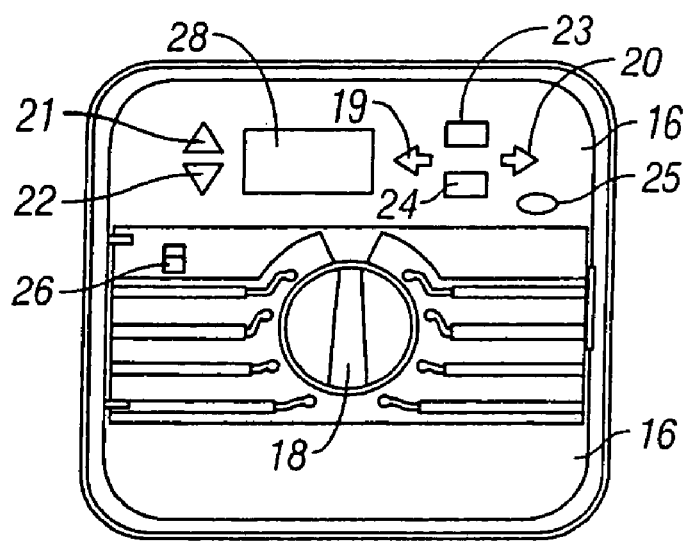
FIG. 2 is an enlarged plan view of the removable face pack.
Figure 3:
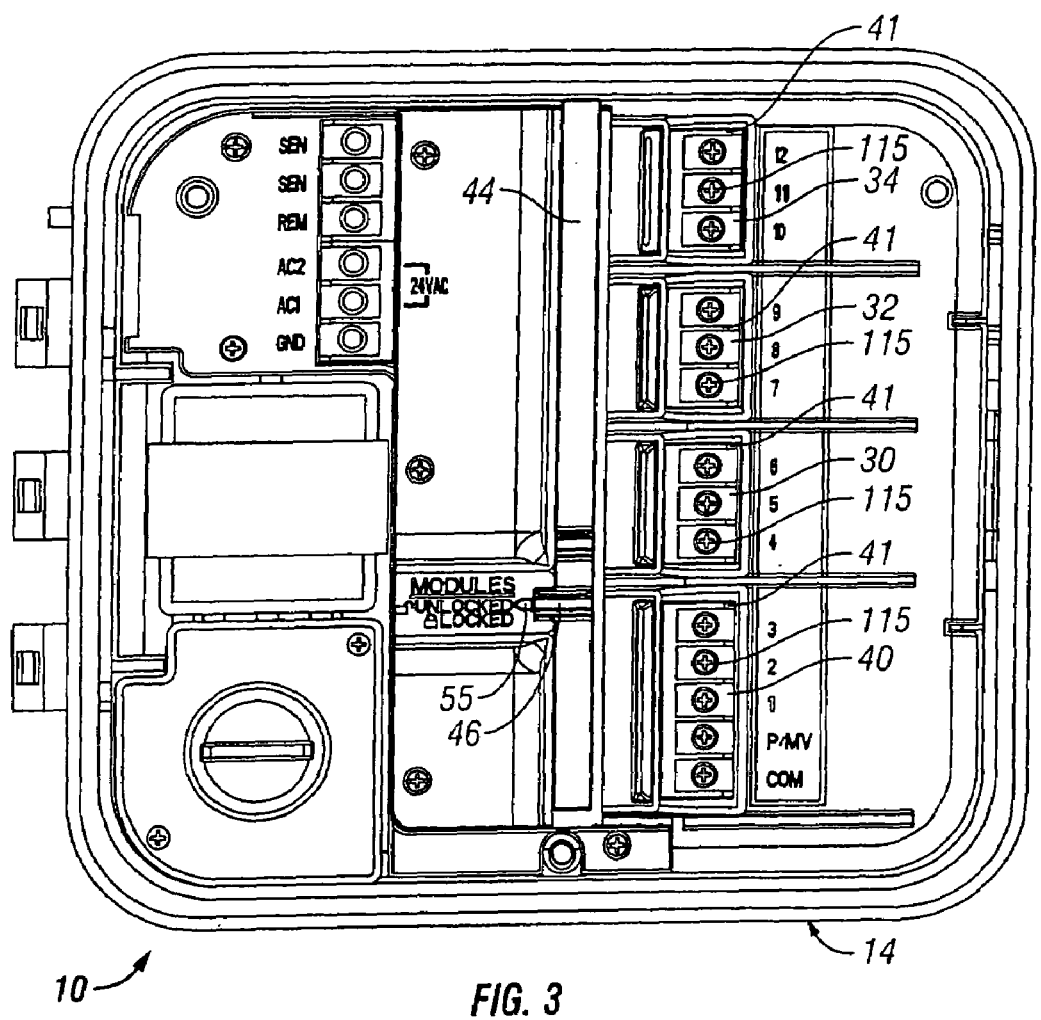
FIG. 3 is a still further enlarged plan view of the components of the irrigation controller of FIGS. 1 and 2 that are mounted in its back panel, which are accessible after the face pack has been removed.

Referring to FIGS. 1 and 2, an irrigation controller 10 in accordance with my invention comprises a wall-mounted structure including a generally box-shaped front door 12 hinged along its right vertical edge to a generally box-shaped back panel 14 (FIG. 3). A generally rectangular face pack 16 (FIG. 2) is removably mounted over the back panel 14 and is normally concealed by the front door 12 when not being accessed for programming. The face pack 16 has a plurality of manually actuable controls including a rotary dial switch 18 and push button switches 19,20,21 22, 23, 24 and 25 as well as slide switch 26, which can be manipulated in conjunction with numbers, words or graphic symbols indicated on a liquid crystal display 28 for entering or selecting a watering program as is well known in the art of electronic irrigation controllers. Custom watering programs can be created by the user by manipulating the rotary dial switch 18 and selected ones of the push button switches 19, 20, 21 22, 23, 24 and 25. Alternatively, existing pre-programmed watering programs can be selected, such as watering all zones every other day for five minutes per zone.

Figure 4:
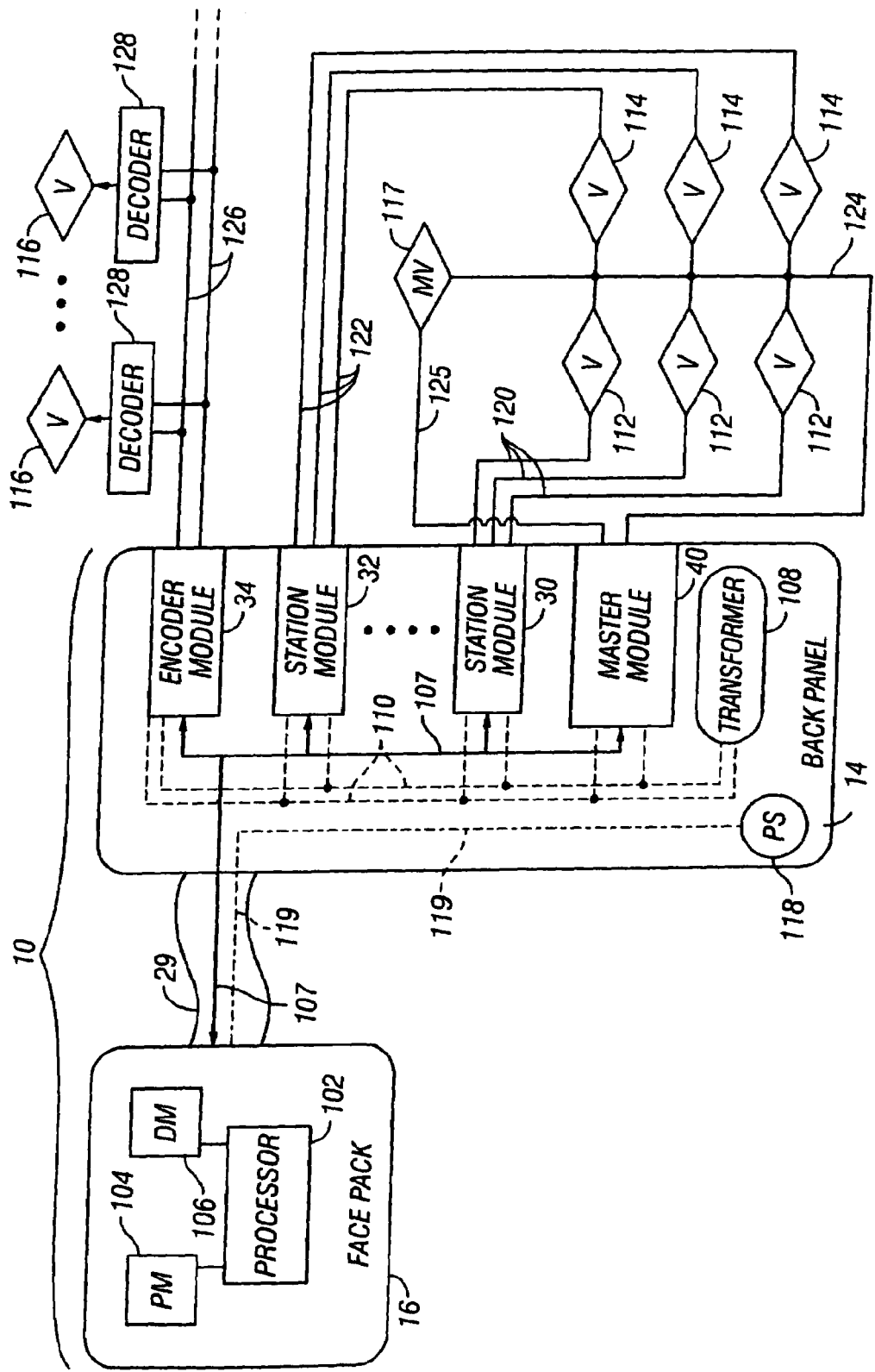
FIG. 4 is a block diagram of an irrigation system that includes the irrigation controller of FIGS. 1, 2 and 3.

The face pack 16 (FIGS. 1 and 2) supports a main circuit board assembly with a processor for executing and implementing a stored watering program. An electrical connection is made between the face pack 16 and the components in the back panel 14 through a ribbon cable 29 (FIG. 4). The circuitry inside the face pack 16 can be powered by a battery to allow a person to remove the face pack 16, unplug the ribbon cable 29, and walk around the lawn, garden area or golf course while entering a watering program or altering a pre-existing watering program. The stored watering program can be a complex set of run time and cycle programs, or a portion thereof, such as a simple five minute cycle routine for a single station.

Referring to FIG. 3, female electrical connectors (not illustrated) in the ends of three box-like modules 30, 32 and 34 receive corresponding male card edge connectors (not illustrated) with mating electrical contacts. The modules 30, 32 and 34 are received in side-by-side fashion in a bay formed in the back panel 14 (FIG. 3) which is separate from the face pack 16 that encloses the processor. A larger, fourth box-like master module 40 plugs into the bay onto its own wider card edge connector and interfaces with a pump and sensor (not illustrated).

A locking slide bar 44 (FIG. 3) with a V-shaped gripping member 46 extends above the bay and may be slid up and down in FIG. 3 between an unlocked position and a locked position. Projections (not illustrated) on the underside of the slide bar 44 engage and disengage with projections (not illustrated) on the top surfaces of the modules to achieve the locked and unlocked states. A pointed tab 55 extending from the gripping member 46 alternately points to UNLOCKED and LOCKED indicia molded into the adjacent back panel structure to indicate the module connection status to the user. The positive module locking mechanism guards against partial or incomplete insertion of a module that could lead to open connections or shorts that would make a station or zone inoperable. The user is given visual and tactile feedback indicating that a positive lock has been established in the sense that each module has been fully inserted. The plurality of modules 30, 32, 34 and 40 are simultaneously locked and unlocked with respect to their respective receptacles, which in the embodiment illustrated in FIG. 3, are formed by side by side sections or regions of the bay formed in the back panel 14.

As used herein, the term "receptacle" refers to any structure and/or slot, region, area or section of any part of an irrigation controller frame or housing intended to receive and mechanically support, either internally or externally, a module and allow electrical contact and/or wireless connection between circuitry within the module and circuitry in the remainder of the controller. In the irrigation controller 10, each of the receptacles is defined by short sidewalls (not illustrated) that divide a rear support wall (not illustrated) of the rectangular bay in the back panel 14 and includes the associated male card edge connectors.

The back panel 14 (FIG. 3) is an outwardly opening plastic box that provides a support and a protective enclosure for removably receiving the modules 30, 32, 34 and 40. The back panel 14 is typically installed on a vertical wall of a building structure so that the modules, such as 30 are plugged in and removed in a horizontal direction, lateral relative to the user. In other words, the back panel 14 is oriented so that the modules are in a vertical column with the module 34 on top and the module 40 on the bottom. This prevents the weight of the modules from tending to unplug the same as might occur if the back panel 14 were mounted by rotating it ninety degrees clockwise from the orientation illustrated in FIG. 3.

The stripped ends of the wires that lead to the stations are secured to conventional screw terminals 115 (FIG. 3) of the modules 30, 32, 34 and 40. The screw terminals 115 are separated by upstanding plastic divider walls 41 to prevent contact between adjacent wires. The valves may be of the type disclosed in U.S. Pat. No. 5,996,608 granted Dec. 7, 1999 of Richard E. Hunter et al. entitled DIAPHRAGM VALVE WITH FILTER SCREEN AND MOVABLE WIPER ELEMENT, Inc.; U.S. Pat. No. 6,079,437 granted Jun. 27, 2000 to Mathew G. Beutler et al. entitled DIAPHRAGM VALVE WITH FLOW CONTROL STEM AIR BLEED; or U.S. Pat. No. 5,979,482 granted Nov. 9, 1999 of Loren W. Scott entitled REMOVABLE CAPTIVE PLUNGER WITH CONTAMINATION PROTECTION, all assigned to Hunter Industries, Inc., the entire disclosures of which are hereby incorporated by reference.

The term "solenoid actuated valve" as used herein shall also encompass valves used in irrigation systems in which a pilot valve is not directly opened and closed by a solenoid. These include hydraulically or pneumatically actuated valves which have a solenoid or its electrical equivalent somewhere in the fluid system, and not necessarily next to the gating valve, for controlling the fluid pressure to open and close the valves.

FIG. 4 is a block diagram of an irrigation system that includes the controller 10. A processor 102 mounted in the face pack 16 executes a selected watering program stored in a program memory (PM) 104 using a data memory (DM) 106. See U.S. Pat. No. 5,444,611 granted Aug. 22, 1995 of Peter J. Woytowitz et al. entitled LAWN AND GARDEN IRRIGATION CONTROLLER, also assigned to Hunter Industries, Inc., the entire disclosure of which is hereby incorporated by reference. The program memory 104 may be provided as a read only memory (ROM), a flash memory, or other suitable permanent or semi-permanent micro-electronic memory. The data memory 106 is preferably a random access memory (RAM). The processor 102 may comprise a microprocessor that uses separate memory, or a micro-computer with on-chip memory that serves the same functions as the program memory 104 and data memory 106. The manually actuable controls and the display of the controller 10 are not illustrated in FIG. 4 for the sake of simplicity. They are interfaced with the processor 102 in the usual fashion. The processor 102 is coupled through suitable input/output (I/O) devices (not illustrated), an electro-optic isolator (not illustrated) and a bus 107 that is routed through the ribbon cable 29 to the male card edge connectors in each of the receptacles in the back panel 14.

The processor 102 (FIG. 4) controls the removable modules 30, 32, 34 and/or 40. Serial or multiplexed communication is enabled over the bus 107 so that all of the information as to which stations or zones should be turned ON and OFF at any given time is present at each receptacle. A twenty-four volt AC power signal from a transformer 108 plugged into a wall outlet is supplied to each of the modules over a pair of lines 110 connected to the male card edge connectors of each of the receptacles. The twenty-four volt AC power is used by the modules 30, 32 and 34 for switching solenoid actuated valves 112, 114 and 116 ON and OFF. In FIG. 4 the valves 112, 114 and 116 are denoted as diamonds with the letter "V" in the middle. The twenty-four volt AC power signal from the transformer 108 is also used by the master module 40 to control a pump or master valve (MV) 117. DC power is supplied by the power supply (PS) 118 to the face pack 16 via line 119 that extends within the ribbon cable 29.

A suitable electrical port (not illustrated) may be connected to the processor 102 for downloading a watering program that has been created on a personal computer and downloaded into a smart card, portable data shuttle or other removable media. See for example U.S. Pat. No. 6,088,621 granted Jul. 11, 2000 of Peter J. Woytowitz et al. entitled PORTABLE APPARATUS FOR RAPID RE-PROGRAMMING OF IRRIGATION CONTROLLERS, also assigned to Hunter Industries, Inc., the entire disclosure of which is hereby incorporated by reference. Alternatively, the processor 102 could receive programming and/or commands from a master computer via hard-wired or wireless connection. The programming executed by the processor 102 can include a cleaning cycle which momentarily turns on each valve after completion of a run cycle to flush debris away from the valve seat. See U.S. Pat. No. 5,829,678 granted Nov. 3, 1998 of Richard E. Hunter et al. entitled SELF-CLEANING IRRIGATION REGULATOR VALVE APPARATUS, also assigned to Hunter Industries, Inc., the entire disclosure of which is hereby incorporated by reference.

The station modules 30 and 32 (FIG. 4) are configured for insertion into corresponding receptacles in the back panel 14. The station modules 30 and 32 are connectable to corresponding solenoid actuated valves 112 and 114 through dedicated field valve lines 120 and 122. The valves 112 and 114 are connected to a common return line 124. A dedicated field valve line 125 connects the master module 40 to the master valve 117. The return line 124 connects to the master valve 117 and the master module 40. Typically these lines comprise insulated twelve gauge wires whose stripped ends are secured to the screw terminals 115 of the modules 30, 32 and 40. Typically the valves 112 and 114 are mounted in subterranean boxes relatively close to the controller 10, i.e. within one hundred feet of the controller 10. Thus the station modules 30 and 32 are used for controlling nearby valves 112 and 114. The valves 112 and 114 control the supply of pressurized water through subterranean PVC pipes (not illustrated) equipped with risers and sprinklers. The station modules 30 and 32 each include a micro-controller and at least one switching device, such as a triac, for selectively supplying the twenty four volt AC power signal from the transformer 108 that energizes the corresponding solenoid actuated valve. In the example shown, the station modules 30 and 32 each include three switching devices and can independently control three separate valves or stations. Suitable synchronous serial data and asynchronous serial data station module circuits are disclosed in the aforementioned U.S. Pat. No. 6,721,630 B1, the entire disclosure of which is incorporated herein by reference.

The encoder module 34 (FIG. 4) is also configured for insertion into a corresponding one of the receptacles and is connectable to a multi-wire path 126 for sending encoded signals and the twenty-four volt AC power signal from the transformer 108 along the multi-wire path 126 for selectively energizing the valves 116. The encoder module 34 may be physically larger than the station modules 30 and 32 and therefore it may have to bridge more than one of the receptacles, i.e. connect to more than one of the male card edge connectors that would normally connect to several station modules. Alternatively, the controller 10 could be provided with a plurality of smaller receptacles for receiving the station modules and one or more larger receptacles for receiving encoder modules.

While the system of FIG. 4 is illustrated as a two-wire system, it will be understood that it could be readily modified to function as a three-wire system. As used herein the term "multi-wire path" encompasses both two wire and three wire configurations and other configurations containing more than three wires extending together. The valves 116 are connected to corresponding decoder circuits 128 connected in parallel along the multi-wire path 126, which in this case is a two wire path. The valves 116 are typically "far away", i.e. they are installed hundreds, or even thousands of feet away from the controller 10. Special pulsing techniques known by those skilled in the art can be used to operate the far away solenoid valves 116 with very low power. The valves 116 also control the supply of pressurized water through subterranean PVC pipes (not illustrated) equipped with risers and sprinklers.

Figure 5:
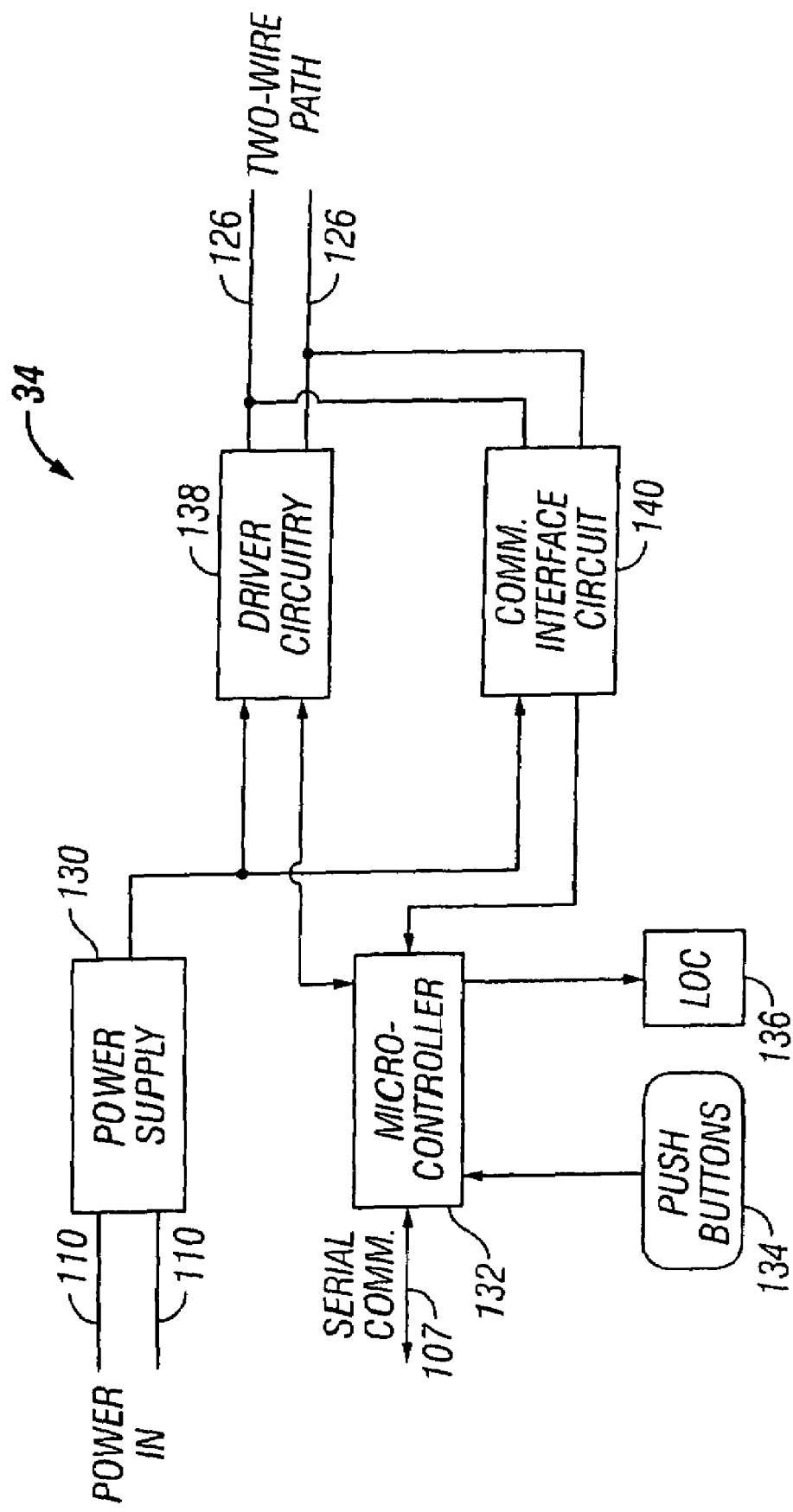
FIG. 5 is a block diagram of an exemplary circuit for the encoder module illustrated in the block diagram of FIG. 4.

FIG. 5 illustrates the circuitry of the encoder module 34. The twenty four AC power signal from the transformer 108 is supplied via lines 110 to the male card edge connector in the receptacle into which the encoder module 34 is plugged. A power supply 130 supplies a DC signal to a micro-controller 132. The micro-controller receives serial communications commands from the processor 102 via bus 107. Push buttons 134 and an LCD display 136 are connected to the micro-controller 132 and are used to identify and program the decoder circuits 128. Driver circuitry 138 receives an AC power signal from the power supply 130 and command signals from the micro-controller 132. The driver circuitry 138 typically includes an H-bridge with current sensing which may be duplicated for driving more than one two-wire path 126. The driver circuit 138 sends encoded signals and the AC power signal along the two-wire path. Optical isolation (not illustrated) may be provided between the bus 107 and the micro-controller 132. Optionally, the encoder module 34 has a communications interface circuit 140 that is connected between the two-wire path 126 and the micro-controller 132 and provides the encoder module 34 with bi-directional communications capabilities. Therefore, when each of the far away valves 116 is turned ON an acknowledgment signal can be sent back to the processor 102. The bi-directional communication capability provided by the communications interface circuit 140 also enables sensor information, such as that obtained by a moisture sensor, rain sensor, flow rate sensor, temperature sensor, humidity sensor, etc. to be encoded and transmitted back to the processor 102 through the encoder module 104.

Figure 6:
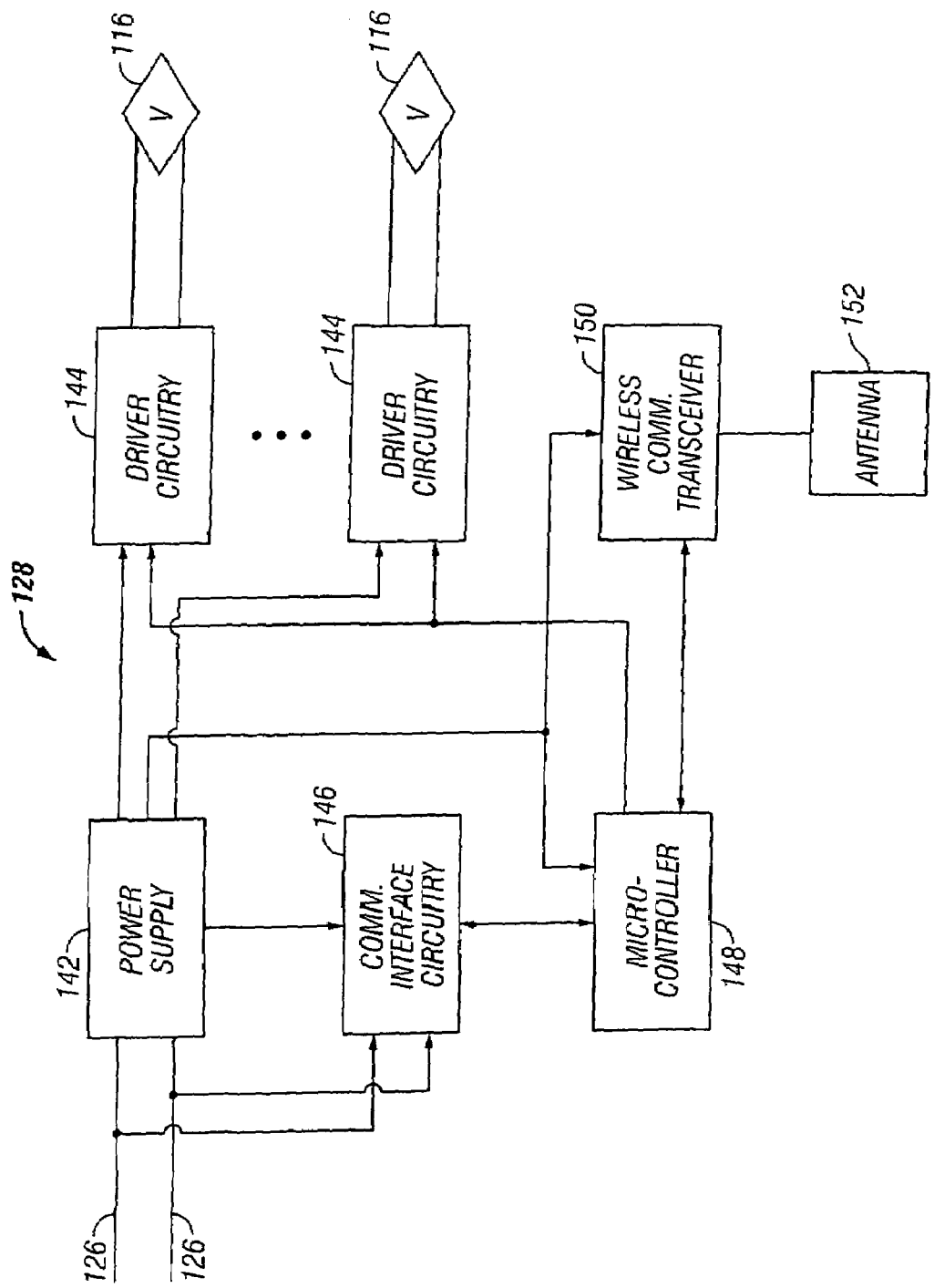
FIG. 6 is a block diagram of an exemplary circuit for the decoder circuit illustrated in the block diagram of FIG. 4.

FIG. 6 illustrates the circuitry of one of the decoder circuits 128. While in FIG. 4 I have illustrated each decoder circuit 128 driving only a single far away valve 116, the decoder circuit 128 may be configured to drive more than one far away valve 116 as illustrated in FIG. 6. The two-wire path 126 is connected to a power supply 142 that supplies power to bi-polar or MOSFET driver circuitry 144 that opens and closes valves 116. The driver circuitry 144 is duplicated several times for controlling more than one valve 116. Bi-directional communications interface circuitry 146 is connected to the two-wire path 126 and to a micro-controller 148. The power supply 142 supplies the DC power to the micro-controller 148 and to a wireless communications transceiver 150 having an antenna 152.

The processor 102 executes the stored watering program and controls the station modules 30 and 32 and/or the encoder module 34 in accordance with the stored watering program. The processor 102 periodically queries each of receptacles to determine how many stations are available to control and which station or zone numbers they are associated with. Resistors (not illustrated) in the back plane of the main circuit board (not illustrated) inside the face pack 16 tell each of the micro-controllers in the modules which of the receptacle each of the modules is plugged into. In this manner, the watering program executed by the processor 102 will correctly control the run and cycle times in each station or zone. While the controller 10 has been described and illustrated as having the capability for receiving two station modules 30 and 32 and one encoder module 34, the controller 10 could have many more receptacles for supporting and controlling more station modules as indicated by the vertical string of dots drawn between the station modules 30 and 32 in FIG. 4. Normally only a single encoder module 34 would need to be added, and it could communicate with far away valves and sensors over several branches of the multi-wire path. However, the controller 10 could be configured to receive and communicate with more than one encoder module 34.

Preferably the processor 102 and the micro-controllers in the station modules 30 and 32 and the encoder module 34 use an encryption algorithm that employs numerical keys buried at certain points in the data stream in order to ensure that only modules produced by the original manufacturer of the controller 10 will be compatible and will operate when plugged into the controller 10. This prevents customers and users from installing inferior expansion modules manufactured by third parties that either do not operate correctly and/or prematurely fail due to the use of inferior components and/or inferior manufacturing standards.

My hybrid controller 10 allows a contractor to install a basic system that can control different nearby zones in familiar fashion. If more nearby zones must be controlled, more dedicated field valve wires can be attached to the unused screw terminals 115 on the existing, already-installed station modules 30 and 32. If more zone still need to be controlled, additional station modules can be inserted into empty receptacles. Where it is not possible or practical to install additional dedicated field wires, or where far away valves are to be controlled, an encoder module 34 can be plugged into the controller 10 in place of one of the station modules 30 or 32 and the two wire path 126 can be used to communicate with the nearby and/or far away valves. Where the encoder module 34 is physically larger than the station modules 30 and 32 it may be necessary to unplug both station modules 30 and 32 and plug the encoder module 34 into the controller 10 so that it bridges or spans the two receptacles previously occupied by the two station modules 30 and 32. Thus in any event the encoder module 34 is plugged into at least one receptacle in the back panel 14. My hybrid controller allows the user-friendly interface of a modular expandable irrigation controller to be used to program a large number of remote valves and avoids the unfamiliarity issues raised with the more complex programming normally associated with prior decoder irrigation systems.

Those skilled in the art of designing irrigation controllers for commercial and residential landscaping will appreciate that I have also invented a novel method of controlling a plurality of valves in an irrigation system including the steps of: 1) entering or selecting a watering program; 2) selectively energizing a first plurality of nearby valves using dedicated field valve lines and a common return line in accordance with the watering program; and 3) selectively energizing a second plurality of far away valves connected to a multi-wire path utilizing encoded signals in accordance with the same watering program and under the control of the same processor. The second and third steps of my method can be performed in reverse order or simultaneously.

Figure 7:
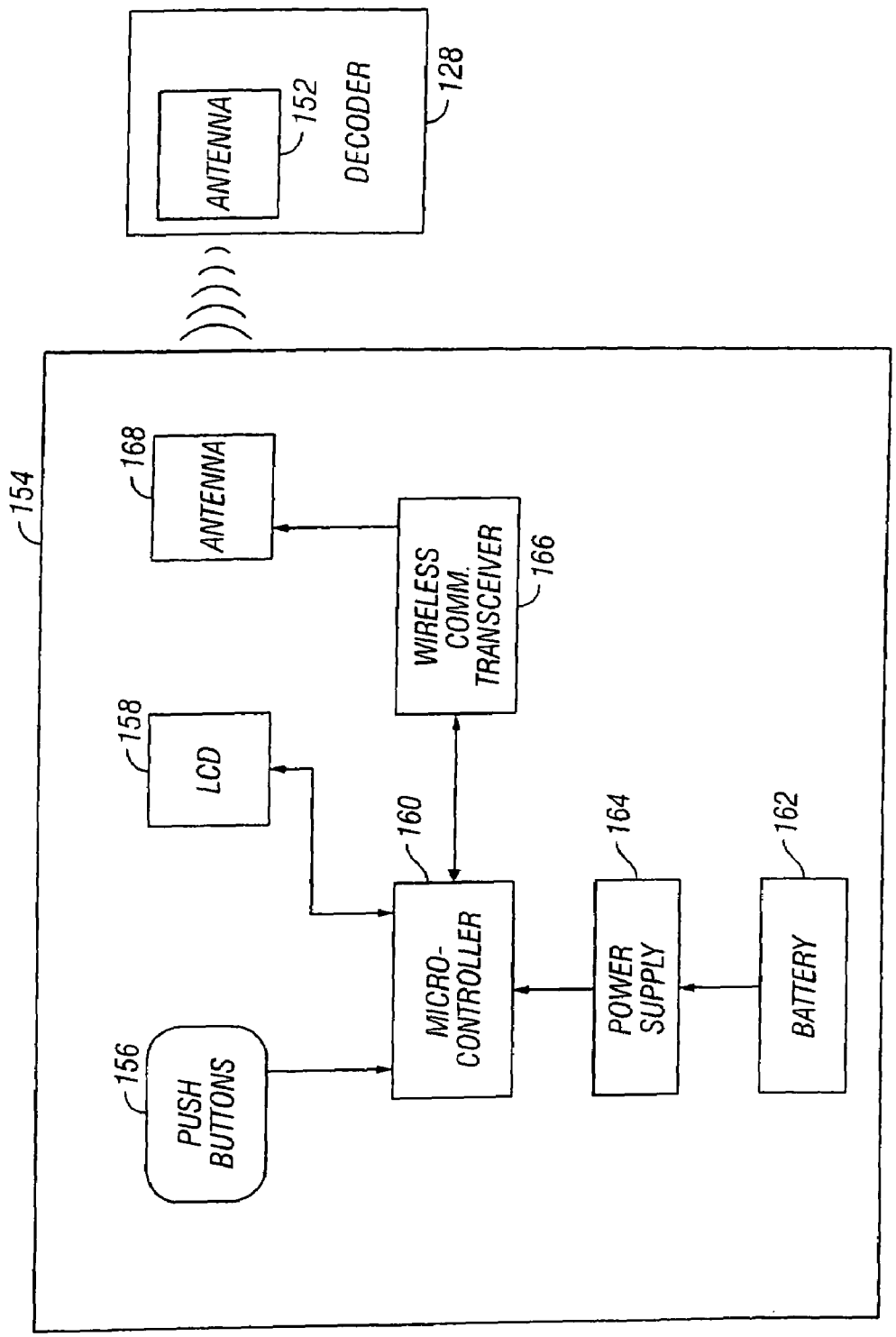
FIG. 7 is a block diagram illustrating the wireless communication with the decoder circuit of FIG. 6.

The decoder circuits 128 are preferably contained within rugged waterproof enclosures that can be buried in the ground next to their corresponding far away valves 116. Their identities may be programmed into the controller 10 in association with a particular zone using their serial numbers or programmed by connecting a hand held device (not shown) that is directly connected to their wires before they are attached to the multi-wire path 126. Preferably, each decoder circuit 128 is programmed in wireless fashion. FIG. 7 is a block diagram illustrating the wireless programming of the decoder circuit 128. A hand-held decoder programmer 154 has push buttons 156 and an LCD display 158 connected to a micro-controller 160 that receives power from a battery 162 through a power supply 164. The micro-controller 160 is coupled to a wireless transmit/receive (transceiver) circuit 166 connected to an antenna 168. The wireless programming of the decoder circuit 128 is preferably very low power and very short range to prevent inadvertent reprogramming of adjacent decoder circuits 128. This can be accomplished by placing the antenna 168 of the hand-held decoder programmer 154 close to the antenna 152 of the decoder circuit 128 and by tuning the antennas and selecting the frequency and power to ensure that adjacent decoder circuits are not inadvertently programmed. A module (not illustrated) containing the decoder circuit 128 can also be placed it into a proximity device such as a cylindrical container (not illustrated) with an inductive loop or coil wound about the same that is connected to the hand-held decoder programmer 154 and functions in place of its internal antenna 168. While I have illustrated the decoder circuit 128 and hand-held decoder programmer 154 as having transceivers 150 and 166, respectively, so that they can exchange data and commands bi-directionally, it will be understood by those skilled in the art that wireless programming of the decoder circuit 128 can be accomplished by simply having a transmitter in the hand-held decoder programmer 154 and a receiver in the decoder circuit 128. The wireless link can also be used for diagnostic purposes such as checking the health of the hand-held decoder programmer 154, whether or not a solenoid is attached, whether there is a short in the valve wiring, whether there is an open circuit in the valve wiring, etc.

Thus I have also invented a method of remotely programming a decoder circuit adapted for use in an irrigation system. This is done by: 1) providing a hand-held programmer with a transmitter connected to a first antenna; 2) placing the hand-held programmer in close proximity to a decoder circuit configured to be connected to at least one valve and having a receiver connected to a second antenna; 3) entering identity commands via the hand-held programmer and sending them via the transmitter and the first antenna to the second antenna; and 4) receiving the identity commands via the receiver in the decoder circuit and establishing a unique identity for the decoder circuit so that it will respond to commands from an irrigation controller connected to the decoder circuit. The decoder circuit need not be connected to the valve at the time its identity is programmed.

I have further invented a method of remotely exchanging diagnostic information with a decoder circuit adapted for use in an irrigation system. This is done by: 1) providing a hand-held programmer with a first transceiver connected to a first antenna; 2) placing the hand-held programmer in close proximity to a decoder circuit configured to be connected to at least one valve and having a second transceiver connected to a second antenna; 3) using the hand-held programmer to transmit at least one query to the decoder circuit via the first transceiver; 4) receiving the query via the second transceiver in the decoder circuit and transmitting diagnostic information from the decoder circuit via the second transceiver; and 5) receiving the diagnostic information with the first transceiver in the hand-held programmer.

While I have described an embodiment of my hybrid irrigation controller, it will be apparent to those skilled in the art that my invention can be modified in both arrangement and detail. The station modules 30 and 32 could also be provided with bi-directional communication capabilities. My invention could be adapted to a wide variety of other irrigation controller configurations, such as the ICC controller manufactured and sold by Hunter Industries, Inc., disclosed in FIGS. 1–3 of pending U.S. patent application Ser. No. 10/430,929 filed May 5, 2003 of Mathew G. Beutler et al. entitled POSITIVE STATION MODULE LOCKING MECHANISM FOR EXPANDABLE IRRIGATION CONTROLLER, the entire disclosure of which is hereby incorporated by reference. Said application is also assigned to Hunter Industries, Inc. Moreover, it is possible to construct a hybrid irrigation controller in accordance with the teachings of the present invention that does not have removable modules. My controller can operate only the station modules 30 and 32, only the encoder module 34, or both. Therefore the protection afforded my invention should only be limited in accordance with the scope of the following claims.

I claim:

1. A hybrid irrigation controller, comprising:
   means for entry or selection of a watering program;
   means for storing the watering program;
   means for providing a plurality of receptacles for removably receiving at least one station module and/or at least one encoder module;
   the station module being connectable to a corresponding solenoid actuated valve through a dedicated field valve line and common return line and including at least one switching device for selectively providing a first power signal that energizes the corresponding solenoid actuated valve;
   the encoder module being connectable to a multi-wire path for sending encoded signals and a second power signal along the multi-wire path for selectively energizing one of a plurality of solenoid actuated valves connected to corresponding decoder circuits connected along the multi-wire path; and
   processor means for executing the stored watering program and controlling the station module and/or the encoder module in accordance with the stored watering program.

2. The controller of claim 1 wherein the multi-wire path includes two wires.

3. The controller of claim 1 wherein each multi-wire path includes three wires.

4. The controller of claim 1 wherein each of the receptacles includes a card edge connector.

5. The controller of claim 1 wherein the station module includes a micro-controller.

6. The controller of claim 1 wherein the processor means provides at each receptacle the commands for controlling all of the modules.

7. The controller of claim 1 wherein the controller further comprises a back panel in which the receptacles are located.

8. The controller of claim 7 wherein the controller further comprises a face pack removably mounted over the back panel and supporting a circuit board on which the processor means is mounted.

9. The controller of claim 8 wherein the controller further comprises a door hingedly connected to the back panel for enclosing the face pack.

10. The controller of claim 1 and further comprising a master module configured for insertion into a third one of the receptacles and including circuitry for interfacing with a pump.

11. A hybrid irrigation controller, comprising:
    a plurality of manually actuable controls for entry or selection of a watering program;
    a memory for storing the watering program;
    a plurality of receptacles for removably receiving at least one station module and/or at least one encoder module;
    the station module being connectable to a corresponding valve through a dedicated field valve line and common return line and including at least one switching device for selectively providing a first power signal that energizes the corresponding valve;
    the encoder module being connectable to a multi-wire path for sending encoded signals and a second power signal along the multi-wire path for selectively energizing one of a plurality of valves connected to corresponding decoder circuits connected along the multi-wire path; and a processor for executing the stored watering program and controlling the station module and/or the encoder module in accordance with the stored watering program.

12. The controller of claim 11 wherein the multi-wire path includes two wires.

13. The controller of claim 11 wherein each multi-wire path includes three wires.

14. The controller of claim 11 wherein each of the receptacles includes a card edge connector.

15. The controller of claim 11 wherein the station module includes a micro-controller.

16. The controller of claim 11 wherein the processor means provides at each receptacle the commands for controlling all of the modules.

17. The controller of claim 11 wherein the controller further comprises a back panel in which the receptacles are located.

18. The controller of claim 17 wherein the controller further comprises a face pack removably mounted over the back panel and supporting a circuit board on which the processor means is mounted.

19. The controller of claim 18 wherein the controller further comprises a door hingedly connected to the back panel for enclosing the face pack.

20. The controller of claim 11 and further comprising a master module configured for insertion into a third one of the receptacles and including circuitry for interfacing with a pump.

* * * * *